United States Patent
Maltais-Larouche et al.

(10) Patent No.: US 11,214,305 B2
(45) Date of Patent: Jan. 4, 2022

(54) STEERING SYSTEM FOR A VEHICLE

(71) Applicant: BOMBARDIER RECREATIONAL PRODUCTS INC., Valcourt (CA)

(72) Inventors: Emile Maltais-Larouche, Valcourt (CA); Nicolas Laberge, Valcourt (CA); Sebastien Hebert, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 16/481,398

(22) PCT Filed: Jan. 31, 2018

(86) PCT No.: PCT/IB2018/050613
§ 371 (c)(1),
(2) Date: Jul. 26, 2019

(87) PCT Pub. No.: WO2018/142307
PCT Pub. Date: Aug. 9, 2018

(65) Prior Publication Data
US 2020/0130740 A1 Apr. 30, 2020

Related U.S. Application Data

(60) Provisional application No. 62/452,664, filed on Jan. 31, 2017.

(51) Int. Cl.
*B62D 7/16* (2006.01)
*B62D 1/20* (2006.01)
(Continued)

(52) U.S. Cl.
CPC .............. *B62D 7/16* (2013.01); *B62D 1/20* (2013.01); *B62D 7/18* (2013.01); *B62D 7/20* (2013.01); *B62K 5/08* (2013.01)

(58) Field of Classification Search
CPC ... B62D 1/00; B62D 1/02; B62D 1/20; B62D 5/00; B62D 3/02; B62D 7/00; B62D 7/02;
(Continued)

(56) References Cited

U.S. PATENT DOCUMENTS 2,154,558 A * 4/1939 Beemer ................ B62D 7/16
280/93.507
4,563,015 A * 1/1986 Lenhard-Backhaus ...................
B62D 7/14
180/234

(Continued)

FOREIGN PATENT DOCUMENTS

| CN | 1576134 A | 2/2005 |
|---|---|---|
| CN | 1754741 A | 4/2006 |

(Continued)

OTHER PUBLICATIONS

Noble, "Fox Tech: Flaming River's Power Steering Rack Install". [online]. Street Muscle Magazine; Dec. 23, 2016; [retrieved on May 4, 2018]. Retrieved from the Internet: <URL: URL: http://www.streetmusclemag.com/tech-stories/chassis-safety/fox-body-tech-flaming-rivers-power-steering-rack-install.

(Continued)

*Primary Examiner* — Paul N Dickson
*Assistant Examiner* — Caitlin Anne Miller
(74) *Attorney, Agent, or Firm* — BCF LLP

(57) ABSTRACT

A vehicle steering system has a pitman arm being pivotable about a pitman arm pivot axis in response to pivoting of a steering column, a link pivotally connected to the pitman arm, an idler arm pivotally connected to the link and being pivotable about an idler arm pivot axis, the link extending between the pitman arm and the idler arm, a first tie rod pivotally connected to the pitman arm and extending from the pitman arm in a first direction, and a second tie rod
(Continued)

pivotally connected to the idler arm and extending from the idler arm in a second direction, the second direction being opposite the first direction. A vehicle having the vehicle steering system is also described.

20 Claims, 10 Drawing Sheets

(51) Int. Cl.
  *B62D 7/18* (2006.01)
  *B62D 7/20* (2006.01)
  *B62K 5/08* (2006.01)
(58) Field of Classification Search
  CPC ... B62D 7/06; B62D 7/16; B62D 7/08; B62D 7/20
  See application file for complete search history.

(56) References Cited

U.S. PATENT DOCUMENTS

| | | | | |
|---|---|---|---|---|
| 5,267,625 A * | 12/1993 | Shimizu | ............. | B62D 1/166 |
| | | | | 180/443 |
| 5,529,316 A * | 6/1996 | Mattila | ............. | B62D 7/16 |
| | | | | 280/93.51 |
| 5,765,844 A | 6/1998 | Wood | | |
| 6,386,564 B1 * | 5/2002 | Kincad | ............. | B62D 17/00 |
| | | | | 280/93.51 |
| 7,347,434 B2 * | 3/2008 | Lewis | ............. | B62D 7/142 |
| | | | | 180/409 |
| 7,389,998 B2 * | 6/2008 | Kondo | ............. | B60G 7/008 |
| | | | | 280/5.52 |
| 9,278,710 B2 * | 3/2016 | Bokil | ............. | B62D 7/16 |
| 2013/0032430 A1 * | 2/2013 | Zaloga | ............. | B62D 5/0421 |
| | | | | 180/444 |
| 2019/0367088 A1 * | 12/2019 | Couture-Pelletier | .... | B62K 5/08 |

FOREIGN PATENT DOCUMENTS

| | | | | |
|---|---|---|---|---|
| CN | 102039968 A | 5/2011 | | |
| CN | 102490786 A | 6/2012 | | |
| CN | 103072628 A | 5/2013 | | |
| FR | 2947796 A1 * | 1/2011 | ............. | B62D 1/22 |
| FR | 2947796 A1 | 1/2011 | | |
| JP | 2008143298 A | 6/2008 | | |
| JP | 4928924 B2 | 5/2012 | | |

OTHER PUBLICATIONS

International Search Report of PCT/IB2018/050613; dated May 24, 2018; Lee W. Young.

English Translation of Search Report for corresponding Chinese Application No. 201880015113.5, dated Jun. 25, 2021, Examiner: Lei, Ming.

* cited by examiner

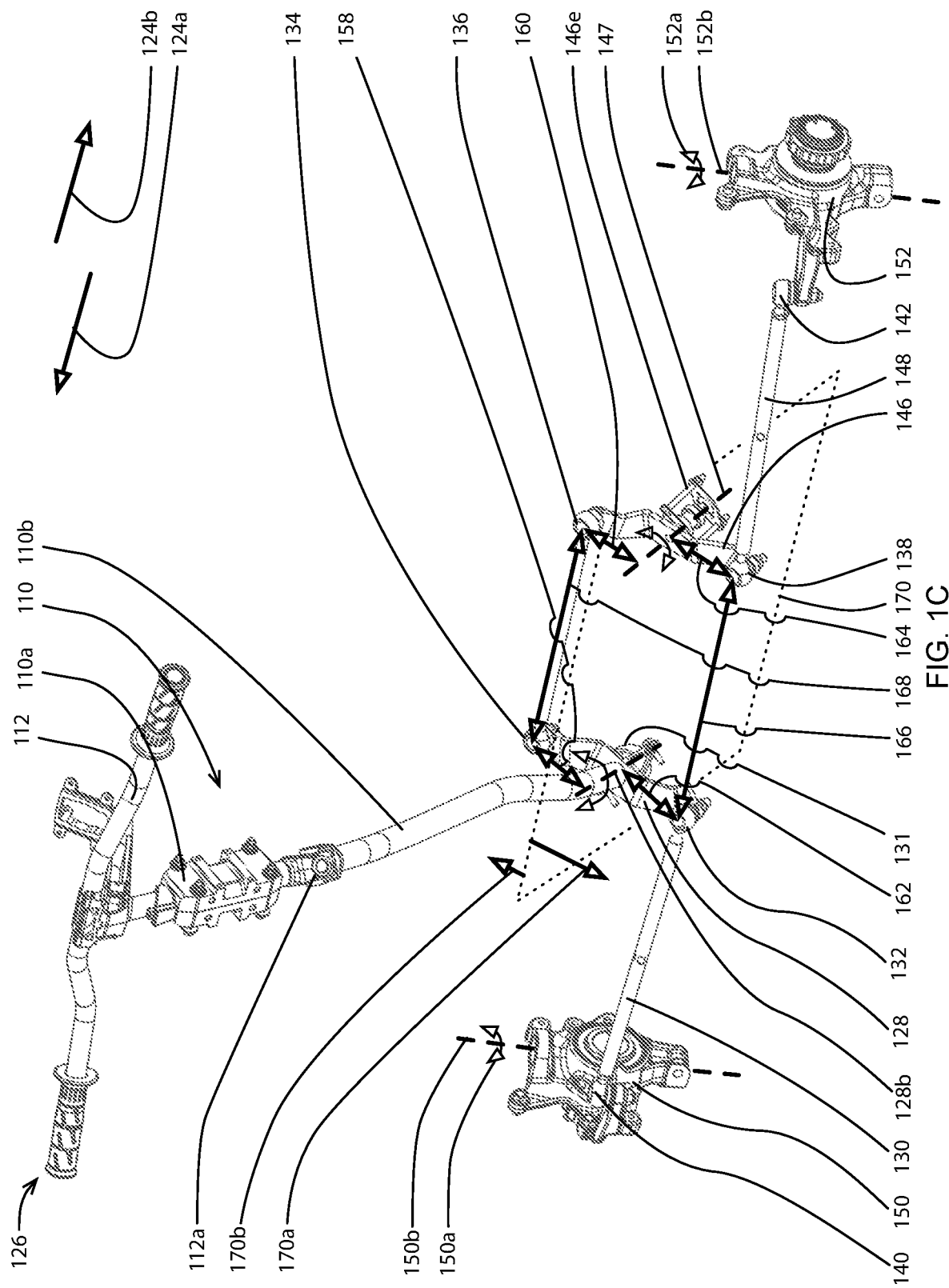

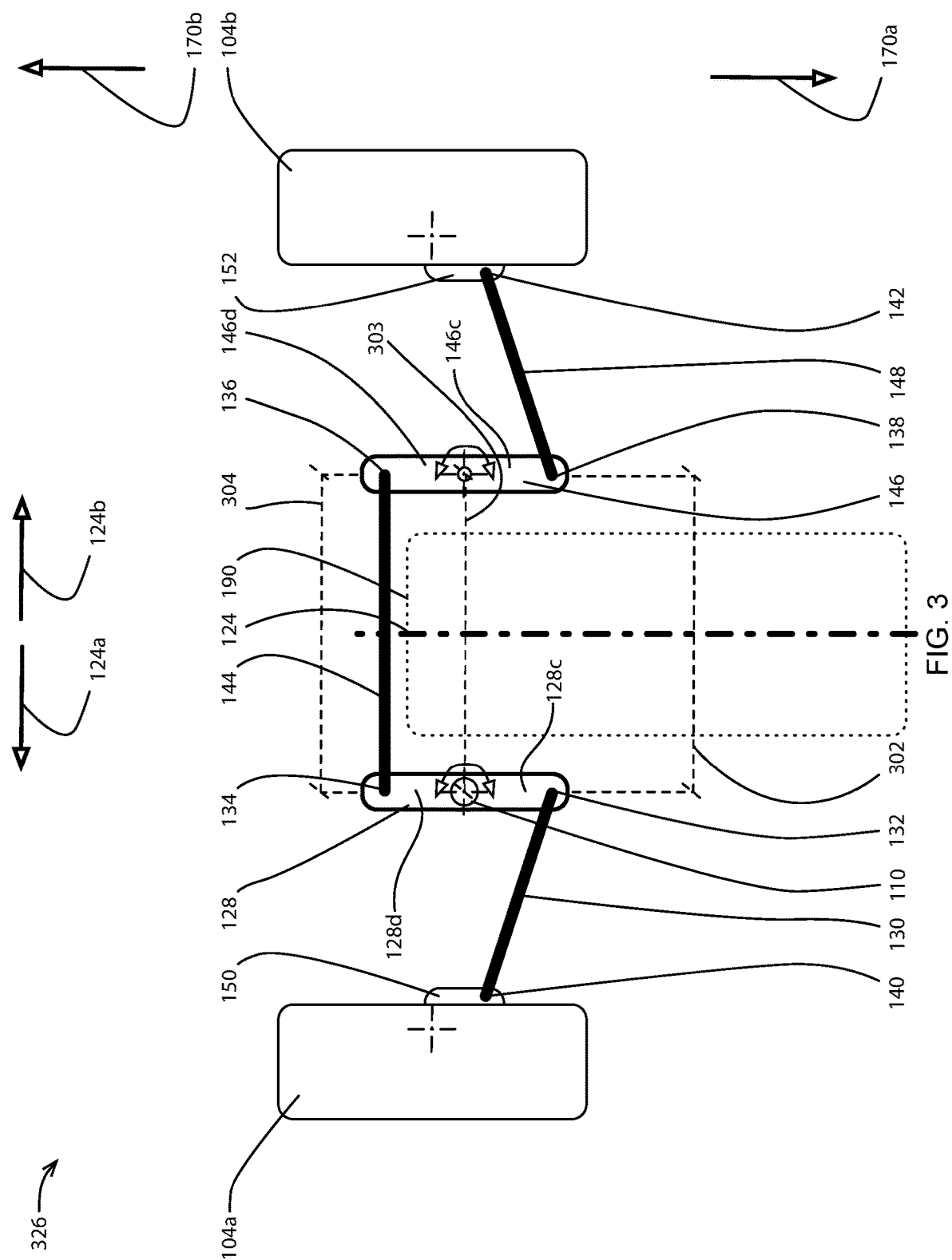

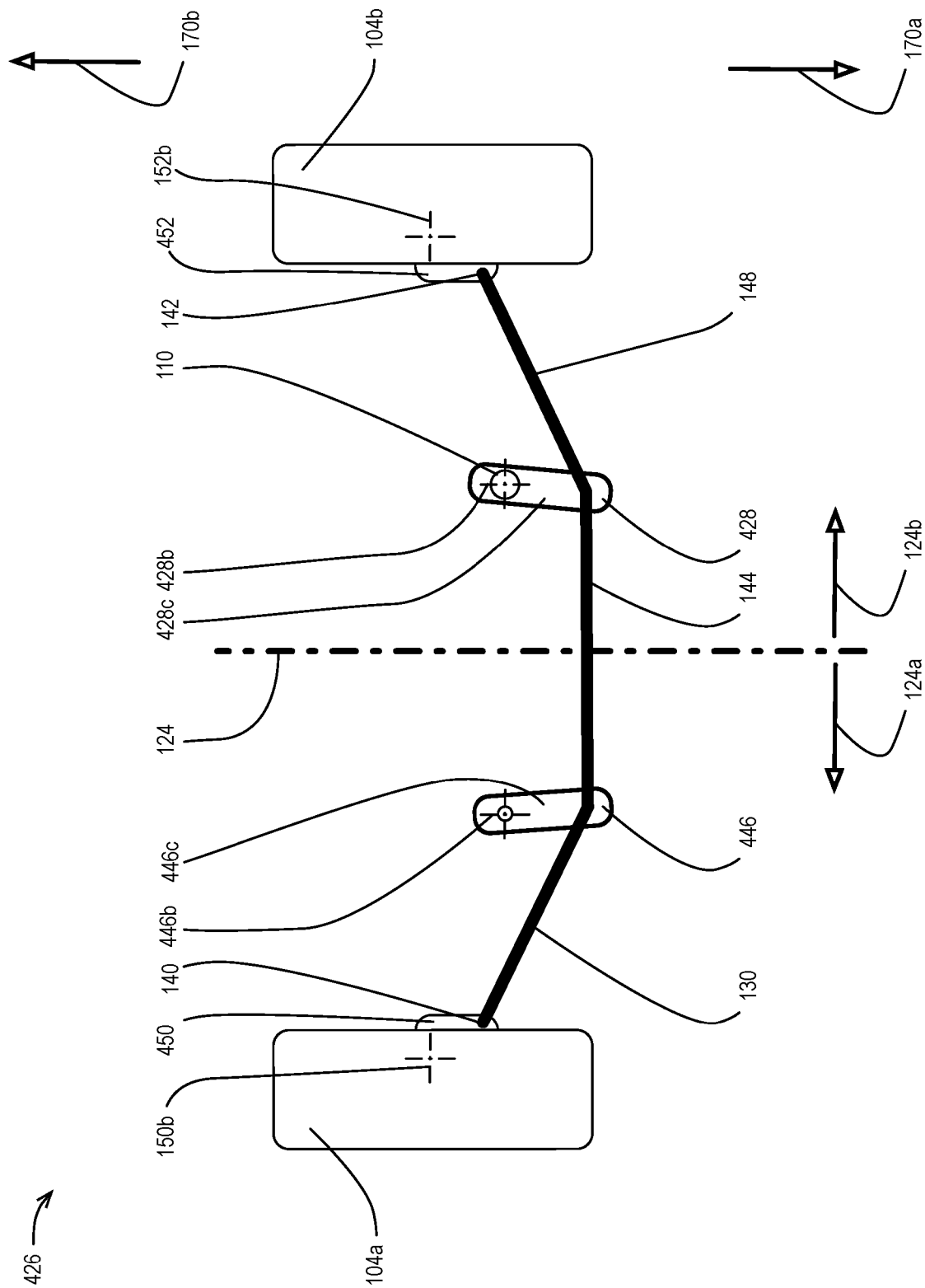

STEERING SYSTEM FOR A VEHICLE

CROSS-REFERENCE

The present application claims priority to U.S. Provisional Patent Application No. 62/452,664, entitled "Steering System for a Vehicle", filed Jan. 31, 2017, the entirety of which is incorporated herein by reference.

TECHNICAL FIELD

The present technology relates to vehicles and vehicle steering systems.

BACKGROUND

Various vehicle steering systems are known. Straddle seat vehicles often use a pitman arm system (as compared to an automotive-style rack and pinion) to transfer the pivoting movement of a steering column into translational movement. For example, U.S. Patent Publication No. 2003/0089166 A1, published on May 15, 2003, discloses a vehicle having a pitman arm steering assembly that includes two tie rods which are pivotally attached at a distal end of the pitman arm and extend laterally outward to the hubs of the front wheels of the vehicle.

As another example, U.S. Pat. No. 8,365,859 B2, published on Feb. 5, 2013, discloses a vehicle having a motor-driven steering apparatus in which a handle stay provided with a steering handle is fixed to a steering shaft, and a motor-driven steering assist unit is interposed between the steering shaft and a tire wheel side steering member, and a taper coupling portion provided in the handle stay is coupled and fixed to a taper support portion provided in the steering shaft.

One operating condition that needs to be addressed when designing a steering system is bump steer. Bump steer is an effect that causes steerable ground-engaging members of a vehicle to steer slightly without input from a steering input device, such as a steering wheel or steering bars, of the vehicle. In one aspect, bump steer occurs when a vehicle drives over uneven terrain.

Some prior art vehicle steering systems have been designed to reduce bump steer, but have resulted in having a relatively large number of linkages. As a result, these systems can be less responsive (due to increased potential for backlash—looseness developing at connections between linkages) and heavier. Additionally, the more complex a design is, the more expensive it is to manufacture. Also, a large number of linkages takes up a lot of space.

In vehicles, and especially in recreational vehicles, vehicle frame space is often limited. Moreover, in some recreational vehicles, prior art steering systems obstruct space in the vehicle frame, for example in a front of the vehicle frame, that could otherwise be used for other vehicle components, such as a motor. Examples of such vehicles include snowmobiles, all terrain vehicles (ATVs) and three-wheeled vehicles in which two wheels are positioned in the front and are steerable.

SUMMARY

In view of the limitations of the prior art systems, it would be desirable to provide vehicle steering systems that address at least some of the inconveniences of the prior art.

For example, it would be desirable to provide vehicle steering systems that, for at least some vehicles, may provide more flexibility in terms of being adaptable to leave more space in a vehicle frame in an area of interest in the vehicle frame.

The term "pitman arm" as it is used in this document refers to a vehicle steering system link that is operatively attached to a steering column so as to be pivotable about a given axis (which in this document is referred to as the "pitman arm pivot axis") in response to pivoting of the steering column, and has one or more linkages attached to it in such a way that pivoting of the pitman arm causes at least partial linear movement of the one or more other linkages.

The term "idler arm" as it is used in this document refers to a vehicle steering system link that is pivotable about a given axis (which in this document is referred to as the "idler arm pivot axis") in response to pivoting of the pitman arm and has one or more linkages attached to it in such a way that pivoting of the idler arm causes at least partial linear movement of the one or more linkages.

The term "steering input device" as it is used in this document refers to a device, such as a steering wheel or a handlebar, that is operatively connected to a steering column to pivot the steering column.

The terms "forward", "rearward", "left", "leftward", "right", and "rightward" as they are used in this document refer to general directions as would be observed by a driver of a vehicle sitting in a driver seat of the vehicle and facing in a straight forward driving direction. Additionally, an indication that a component extends in a particular direction is not intended to be limited to this direction only, but should instead be understood as indicating that the component extends at least in this direction. For example, a link that extends diagonally forward, leftward and upward could be said to extend in a forward direction, to extend in a left direction or to extend in an upward direction.

The terms "first", "second", "third", "fourth", and so on, are used in this document to merely as placeholders, to distinguish the various features with respect to which these terms are used. For example, this document described first, second, third, fourth, fifth, and sixth points of connection. It will be understood that the points of connection could have been labeled differently, without affecting the substance of the disclosure.

Accordingly, in one aspect, the present technology provides a vehicle steering system having: a pitman arm adapted for being operatively connected to a steering column, the pitman arm being pivotable about a pitman arm pivot axis, the pitman arm being adapted for pivoting in response to pivoting of the steering column; a first tie rod pivotally connected to the pitman arm at a first point and extending from the pitman arm in a first direction; a link pivotally connected to the pitman arm at a second point and extending from the pitman arm in a second direction, the second direction being opposite the first direction; an idler arm pivotally connected to the link at a third point, the idler arm being pivotable about an idler arm pivot axis, the link extending between the pitman arm and the idler arm; and a second tie rod pivotally connected to the idler arm at a fourth point and extending from the idler arm in the second direction.

In some implementations, the pitman arm pivot axis and the idler arm pivot axis extend between a first line and a second line; the first line extending between the first point and the fourth point; and the second line extending between the second point and the third point.

In some implementations, the pitman arm pivot axis and the idler arm pivot axis define a plane; the first point and the fourth point are on a first side of the plane; and the second point and the third point are on a second side of the plane, the second side of the plane being opposite the first side of the plane.

In some implementations, the vehicle steering system also has: the steering column operatively connected to the pitman arm; and a steering input device operatively connected to the steering column.

In some implementations, the vehicle steering system also has: a first steering knuckle pivotally connected to the first tie rod at a fifth point, the first tie rod extending between the first steering knuckle and the pitman arm, the first steering knuckle being pivotable about a first steering axis; and a second steering knuckle pivotally connected to the second tie rod at a sixth point, the second tie rod extending between the second steering knuckle and the idler arm, the second steering knuckle being pivotable about a second steering axis.

In some implementations, a length of the first tie rod is equal to a length of the second tie rod.

In some implementations, a distance normal to the pitman arm pivot axis between the pitman arm pivot axis and the second point is equal to a distance normal to the idler arm pivot axis between the idler arm pivot axis and the third point.

In some implementations, a distance normal to the pitman arm pivot axis between the pitman arm pivot axis and the first point is equal to a distance normal to the idler arm pivot axis between the idler arm pivot axis and the fourth point.

In some implementations, a distance between the first and fourth points is greater than a distance between the second and third points.

In another aspect, the present technology provides a vehicle having: a vehicle frame; a steering column pivotally supported by the vehicle frame; a pitman arm operatively connected to the steering column, the pitman arm being pivotable about a pitman arm pivot axis, the pitman arm pivoting about the pitman arm pivot axis in response to pivoting of the steering column; a first tie rod pivotally connected to the pitman arm at a first point and extending from the pitman arm in a first direction; a link pivotally connected to the pitman arm at a second point and extending from the pitman arm in a second direction, the second direction being opposite the first direction; an idler arm pivotally connected to the link at a third point, the idler arm being pivotable about an idler arm pivot axis, the link extending between the pitman arm and the idler arm; a second tie rod pivotally connected to the idler arm at a fourth point and extending from the pitman arm in the second direction; a first steering knuckle, the first steering knuckle being pivotable about a first steering axis and being pivotally connected to the first tie rod at a fifth point, the first tie rod extending between the first steering knuckle and the pitman arm; a first steerable ground engaging member operatively connected to the first steering knuckle; a second steering knuckle, the second steering knuckle being pivotable about a second steering axis and being pivotally connected to the second tie rod at a sixth point, the second tie rod extending between the second steering knuckle and the idler arm; and a second steerable ground engaging member operatively connected to the second steering knuckle.

In some implementations of the vehicle, the pitman arm pivot axis and the idler arm pivot axis extend between a first line and a second line; the first line extending between the first point and the fourth point; and the second line extending between the second point and the third point.

In some implementations of the vehicle, the pitman arm pivot axis and the idler arm pivot axis define a plane; the first point and the fourth point are on a first side of the plane; and the second point and the third point are on a second side of the plane, the second side of the plane being opposite the first side of the plane.

In some implementations of the vehicle, a length of the first tie rod is equal to a length of the second tie rod.

In some implementations of the vehicle, a distance normal to the pitman arm pivot axis between the pitman arm pivot axis and the first point is equal to a distance normal to the idler arm pivot axis between the idler arm pivot axis and the fourth point.

In some implementations of the vehicle, a distance normal to the pitman arm pivot axis between the pitman arm pivot axis and the second point is equal to a distance normal to the idler arm pivot axis between the idler arm pivot axis and the third point.

In some implementations of the vehicle, a distance between the first and fourth points is greater than a distance between the second and third points.

In some implementations of the vehicle, the pitman arm is positioned on a first side of a central vertical longitudinal plane of the vehicle; and the idler arm is positioned on a second side of the central vertical longitudinal plane, the second side of the central vertical longitudinal plane being opposite the first side of the central vertical longitudinal plane.

In some implementations of the vehicle, the pitman arm and the idler arm are positioned substantially symmetrically about the central vertical longitudinal plane.

In some implementations of the vehicle, the pitman arm pivot axis and the idler arm pivot axis are positioned substantially symmetrically about the central vertical longitudinal plane.

In some implementations of the vehicle, when the vehicle is steered in a straight-ahead direction on level terrain: the first point and the fourth point are positioned substantially symmetrically about the central vertical longitudinal plane; the second point and the third point are positioned substantially symmetrically about the central vertical longitudinal plane; and the fifth point and the sixth point are positioned substantially symmetrically about the central vertical longitudinal plane.

In some implementations of the vehicle, the link extends through the central vertical longitudinal plane.

In some implementations of the vehicle, the link is positioned forward of the first and fourth points.

In some implementations, the vehicle further comprises a motor for propelling the vehicle, the motor being supported by the vehicle frame, the motor being positioned at least partially rearward of the link, and at least partially between the first and fourth points.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings.

In the drawings:

FIG. 1C is a perspective view taken from a rear, right side of a vehicle steering system of the vehicle of FIG. 1A, according to one implementation;

FIG. 3 is a schematic top plan view of a vehicle steering system, according to another implementation; and FIG. 4 is a schematic top plan view of a vehicle steering system, according to yet another implementation.

DETAILED DESCRIPTION

Figure 1A:
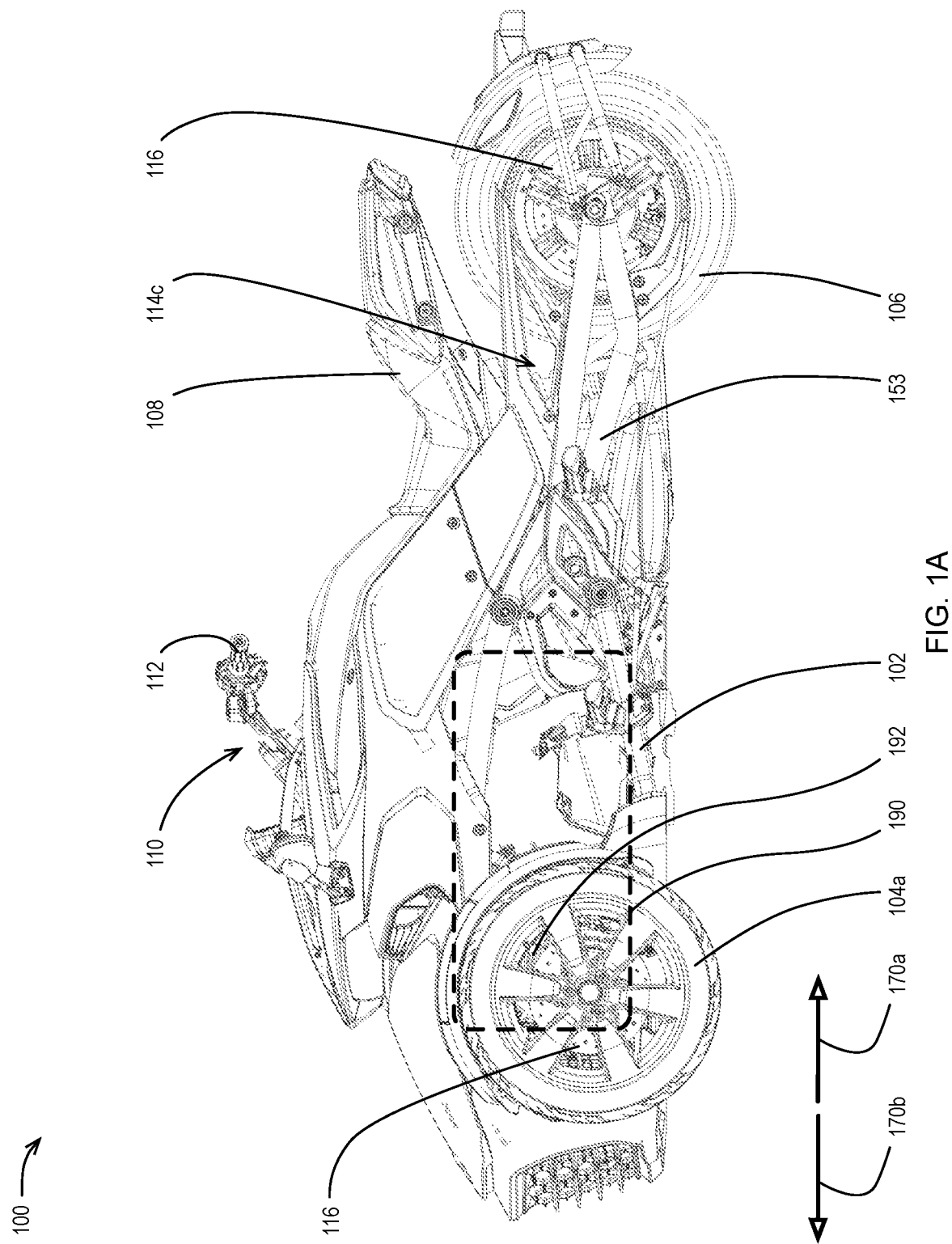
FIG. 1A is a left side elevation view of a three-wheeled vehicle, according to one implementation.
Figure 1B:
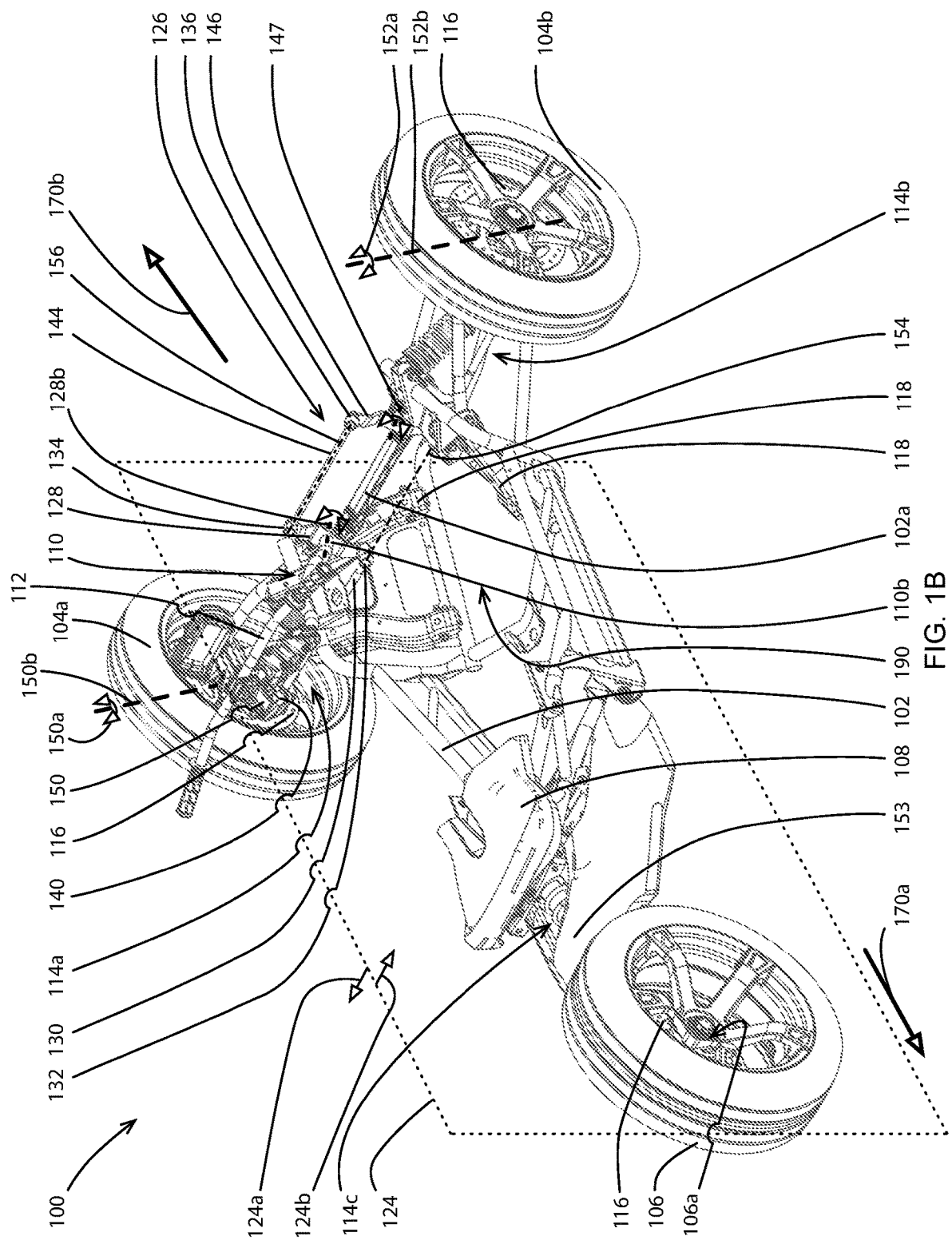
FIG. 1B is a perspective view taken from a rear, right side of the vehicle of FIG. 1A, the vehicle being partially disassembled to better show some of its features.

FIGS. 1A and 1B show a vehicle 100 for carrying a driver and optionally a passenger.

FIG. 1B shows the vehicle 100 being partially disassembled to more clearly show some of its the features. In an aspect, vehicle 100 exemplifies one type of vehicle with which the vehicle steering systems described in this document could be implemented. It is contemplated the vehicle steering systems described in this document could be implemented in other types of vehicle that are different from the vehicles shown and described in this document.

The vehicle 100 that has a vehicle frame 102, to which a front left suspension 114a, a front right suspension 114b, and a rear suspension 114c are connected.

The vehicle 100 also has a front left wheel 104a, a left steering knuckle 150, a front right wheel 104b, a right steering knuckle 152, and a rear wheel 106.

The left steering knuckle 150 is positioned on a left side 124a of a central vertical longitudinal plane 124. The left steering knuckle 150 is mounted to the front left suspension 114a such that it is pivotable, as illustrated by reference arrows 150a, about a left steering axis 150b. The front left wheel 104a is rotatably mounted to the left steering knuckle 150. When the left steering knuckle 150 pivots, the front left wheel 104a pivots with it. The front left wheel 104a is steerable, as will be described in further detail below.

The right steering knuckle 152 is positioned on a rightward side 124b of the central vertical longitudinal plane 124. The right steering knuckle 152 is mounted to the front right suspension 114b such that it is pivotable, as illustrated by reference arrows 152a, about a right steering axis 152b. The front right wheel 104b is rotatably mounted to the right steering knuckle 152. When the right steering knuckle 152 pivots, the front right wheel 104b pivots with it. The front right wheel 104b is steerable, as will be described in further detail below.

The rear wheel 106 is rotatably mounted to a rear swing arm 153 of the rear suspension 114c.

The vehicle 100 has a braking system 116. The braking system 116 is a disk brake braking system that is operatively connected to each of the three wheels 104a, 104b, 106 to provide braking to each of the three wheels 104a, 104b, 106. It is contemplated that in some implementations, the braking system 116 could be any suitable braking system and could be adapted to provide braking to only one wheel, some wheels, or all of the wheels of a vehicle. It is also contemplated that depending on the vehicle, a different kind of braking system could be used.

The vehicle 100 has a straddle seat 108 that is mounted to the vehicle frame 102 and adapted to accommodate a driver and a passenger.

The vehicle frame 102 has motor mounts 118. The motor mounts 118 support a motor 192 that propels the vehicle 100 when the vehicle 100 is in use.

Figure 1D:
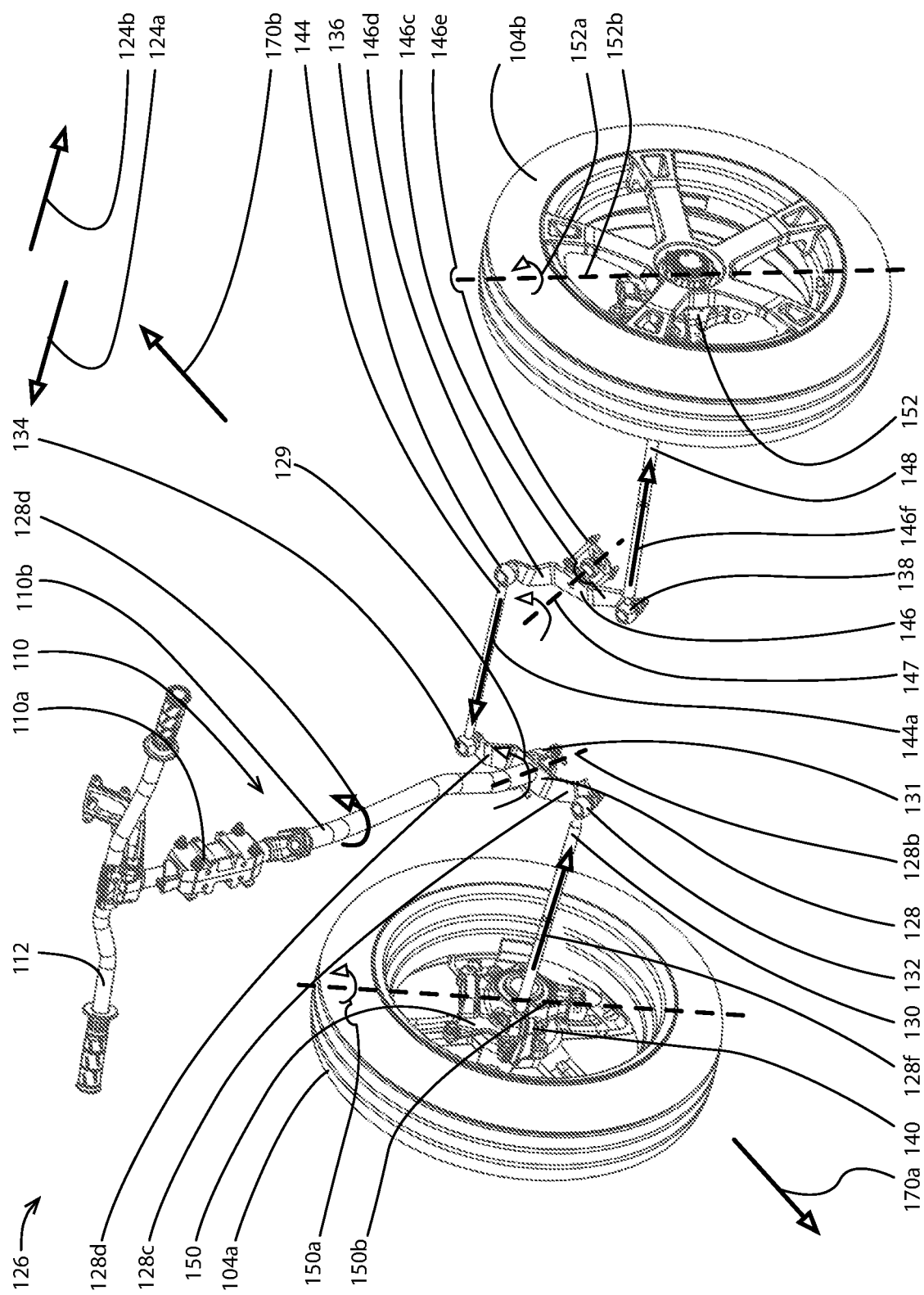
FIG. 1D is a perspective view taken from a rear, right side of the vehicle steering system of FIG. 1C, and the wheels of the vehicle of FIG. 1A.
Figure 1G:
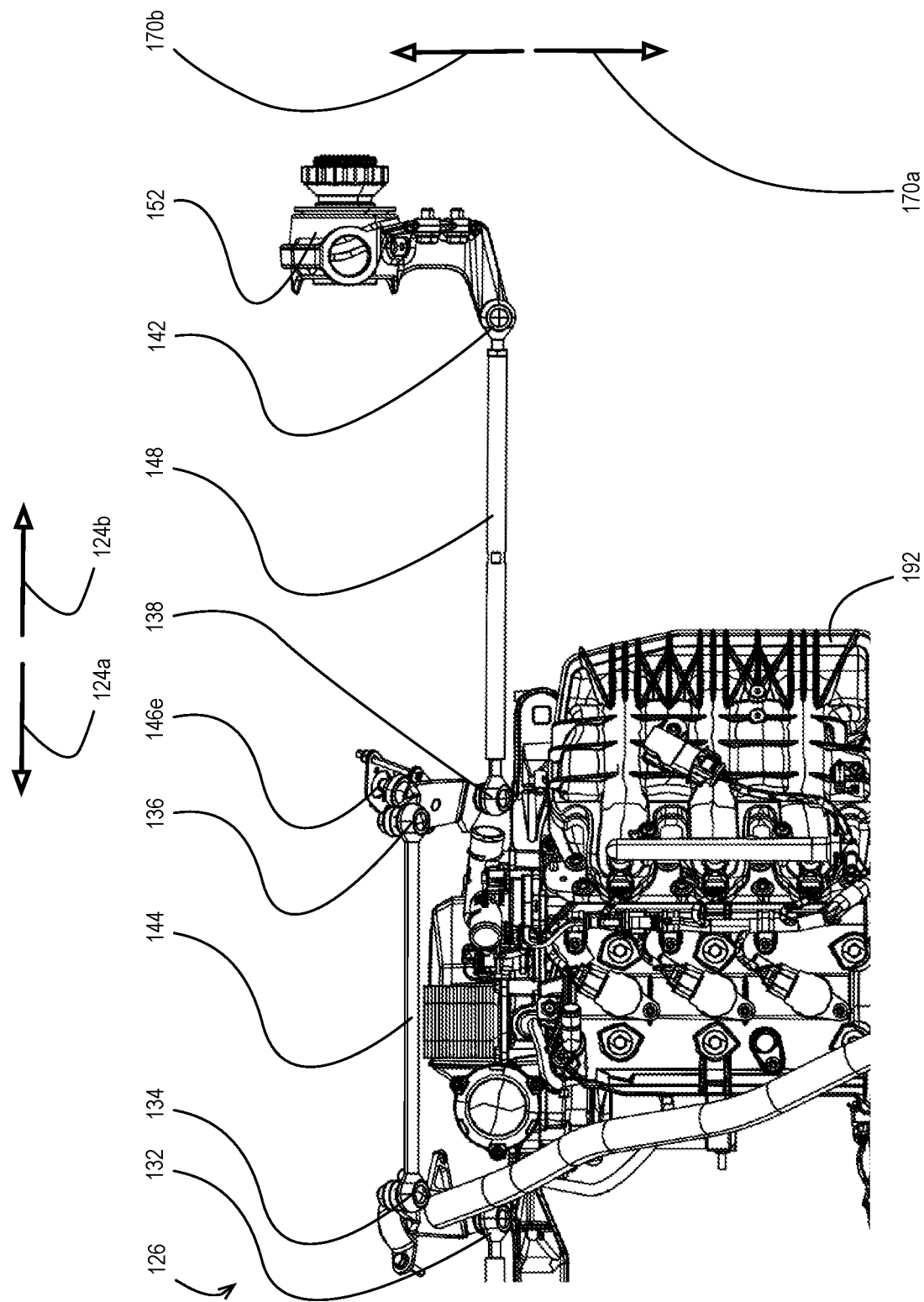
FIG. 1G is a top plan view of a portion of the vehicle steering system of FIG. 1C and of a portion of the motor of the vehicle of FIG. 1A.
Figure 2:
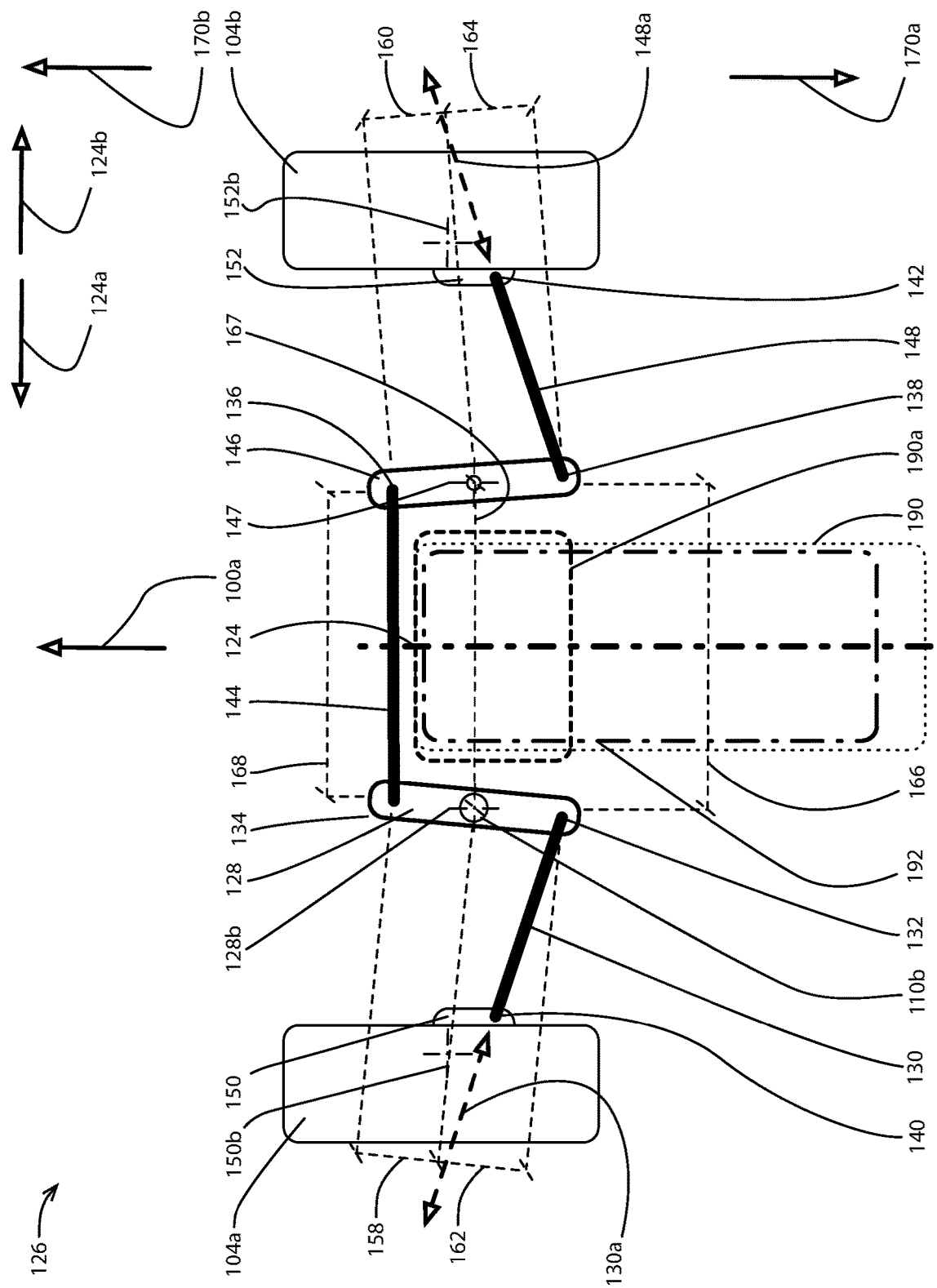
FIG. 2 is a schematic top plan view of the vehicle steering system of FIG. 1C.

The vehicle steering system 126, which will be described in more detail below, and the vehicle frame 102 define a motor space 190. The motor 192 is positioned in the motor space 190. The motor space 190 extends forward 170b in the vehicle frame 102 and receives the motor 192 as shown in FIGS. 1G, 2 and 3. As also shown in FIGS. 1G, 2 and 3, the motor 192 is positioned partially rearward of a link 144 of the vehicle steering system 126 and partially between rod ends 132 and 138. The link 144 and the rod ends 132, 138 are described later in this document.

A drive assembly (not shown) is operatively connected to the motor 192 to receive driving forces from the motor 192. The motor 192 is operatively connected to the rear wheel 106 via the drive assembly to drive the rear wheel 106 to propel the vehicle 100.

The vehicle 100 has additional electronic and mechanical systems that enable operation of the vehicle 100 that are not shown or described in this document to maintain clarity of the description.

A steering column 110 is pivotally supported by the vehicle frame 102. A handlebar 112 is operatively connected to the steering column 110 to pivot the steering column 110. The steering column 110 has an upper steering column portion 110a, and a lower steering column portion 110b. The upper steering column portion 110a is operatively connected to the lower steering column portion 110b via a universal joint 112a. The upper steering column portion 110a extends downward and forward 170b from the handlebar 112 along the center of the vehicle 10. The lower steering column portion 110b extends downward forward and leftward from the universal joint 112a. It is contemplated that the steering column 110 could have any suitable number of universal joints, or other suitable joints and/or any number of steering column portions, including a single portion.

The vehicle frame 102 includes a positioning frame member 102a that extends laterally at a front thereof. A pitman arm 128 is operatively pivotally connected to the positioning frame member 102a leftward 124a of the central vertical longitudinal plane 124. The pitman arm 128 is pivotable about a pitman arm pivot axis 128b. It is contemplated that the pitman arm 128 could be pivotally connected to other members of the vehicle frame 102. It is contemplated that the pitman arm 128 could be positioned on the rightward side 124b of the central vertical longitudinal plane 124, in which case the lower steering column portion 110b would extend rightward instead of leftward. An example of such an implementation is shown in FIG. 4, and is described later in this document.

The pitman arm 128 has a rearward pitman arm portion 128c and a forward pitman arm portion 128d. The rearward pitman arm portion 128c extends from the forward pitman arm portion 128d. The rearward pitman arm portion 128c extends in a rearward direction. The forward pitman arm portion 128d extends in a forward direction.

The pitman arm 128 is pivotally connected to a left portion of the positioning frame member 102a via a ball joint 131 inserted in the positioning frame member 102a. It is contemplated that the pitman arm 128 could be operatively pivotally connected to the positioning frame member 102a via any other suitable pivotable connection.

The lower steering column portion 110b is directly connected to the pitman arm 128 to pivot the pitman arm 128 about the pitman arm pivot axis 128b such that pivoting of the handlebar 112 pivots the pitman arm 128 about the pitman arm pivot axis 128b.

In this implementation, the lower steering column portion 110b pivots about the pitman arm pivot axis 128b. It is contemplated that the lower steering column portion 110b need not pivot about the pitman arm pivot axis 128b. For example, the lower steering column portion 110b could be operatively connected to the pitman arm 128 via a plurality of linkages (not shown) and/or joints such that the lower steering column portion 110b would pivot about a lower steering column pivot axis (not shown) that is offset and/or skewed from the pitman arm steering axis 128b.

An idler arm 146 is operatively pivotally connected to the positioning frame member 102a, rightward 124b of the central vertical longitudinal plane 124. The idler arm 146 is pivotable about an idler arm pivot axis 147. It is contemplated that the idler arm 146 could be pivotally connected to other members of the vehicle frame 102. It is contemplated that the idler arm 146 could be positioned on the left side of the central vertical longitudinal plane 124. An example of such an implementation is shown in FIG. 4, and is described later in this document.

The idler arm 146 has a rearward idler arm portion 146c and a forward idler arm portion 146d. The rearward idler arm portion 146c extends from the forward idler arm portion 146d. The rearward idler arm portion 146c extends in a rearward direction. The forward idler arm portion 146d extends in a forward direction.

The idler arm 146 is pivotally connected to the positioning frame member 102a via a pivot assembly 146e that, in the current implementation, includes a ball joint. It is contemplated that the idler arm 146 could be operatively pivotally connected to the positioning frame member 102a via any other suitable pivotable connection.

Figure 1E:
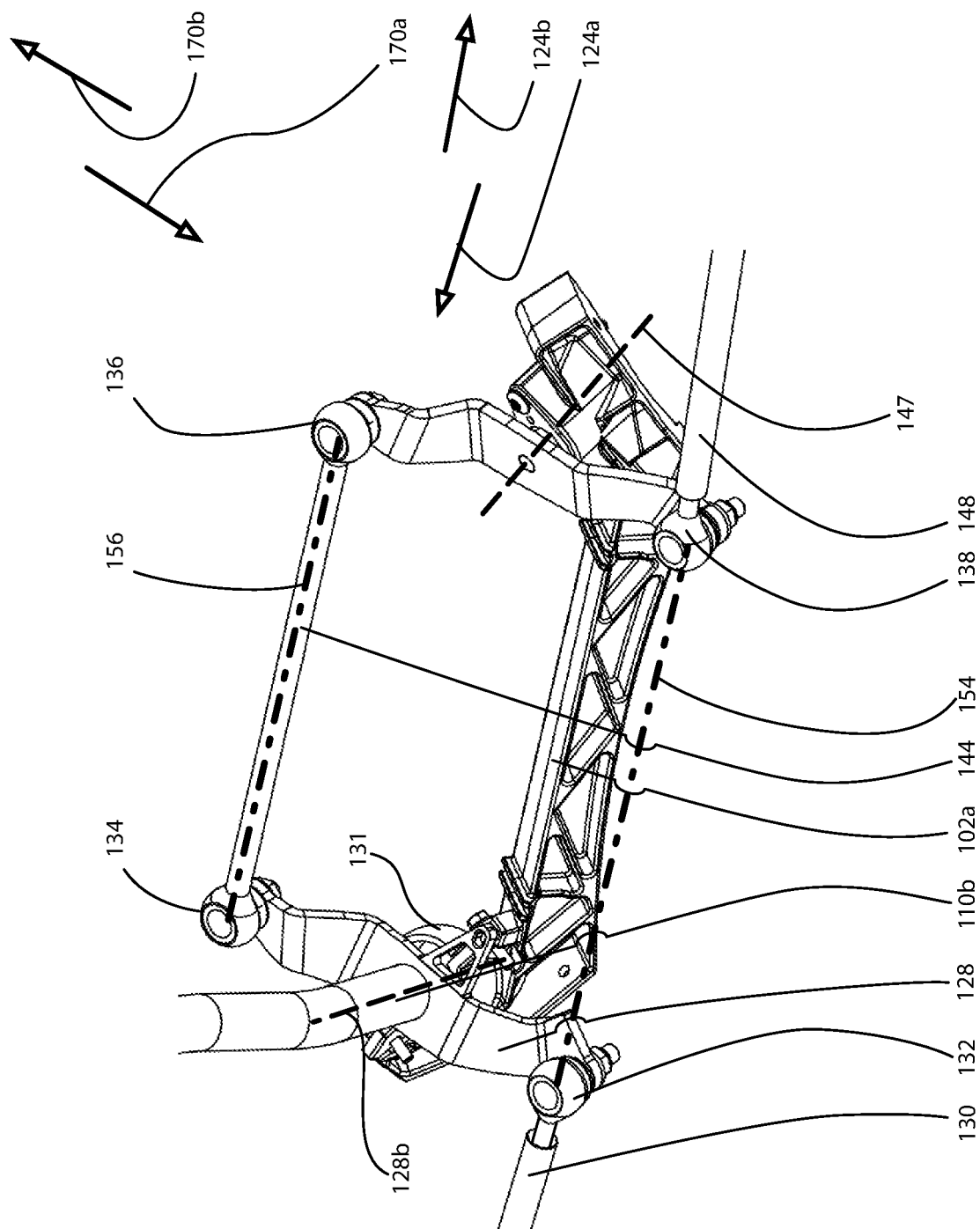
FIG. 1E is a close-up perspective view taken from a rear, right side of a central portion of the vehicle steering system of FIG. 1C.
Figure 1F:
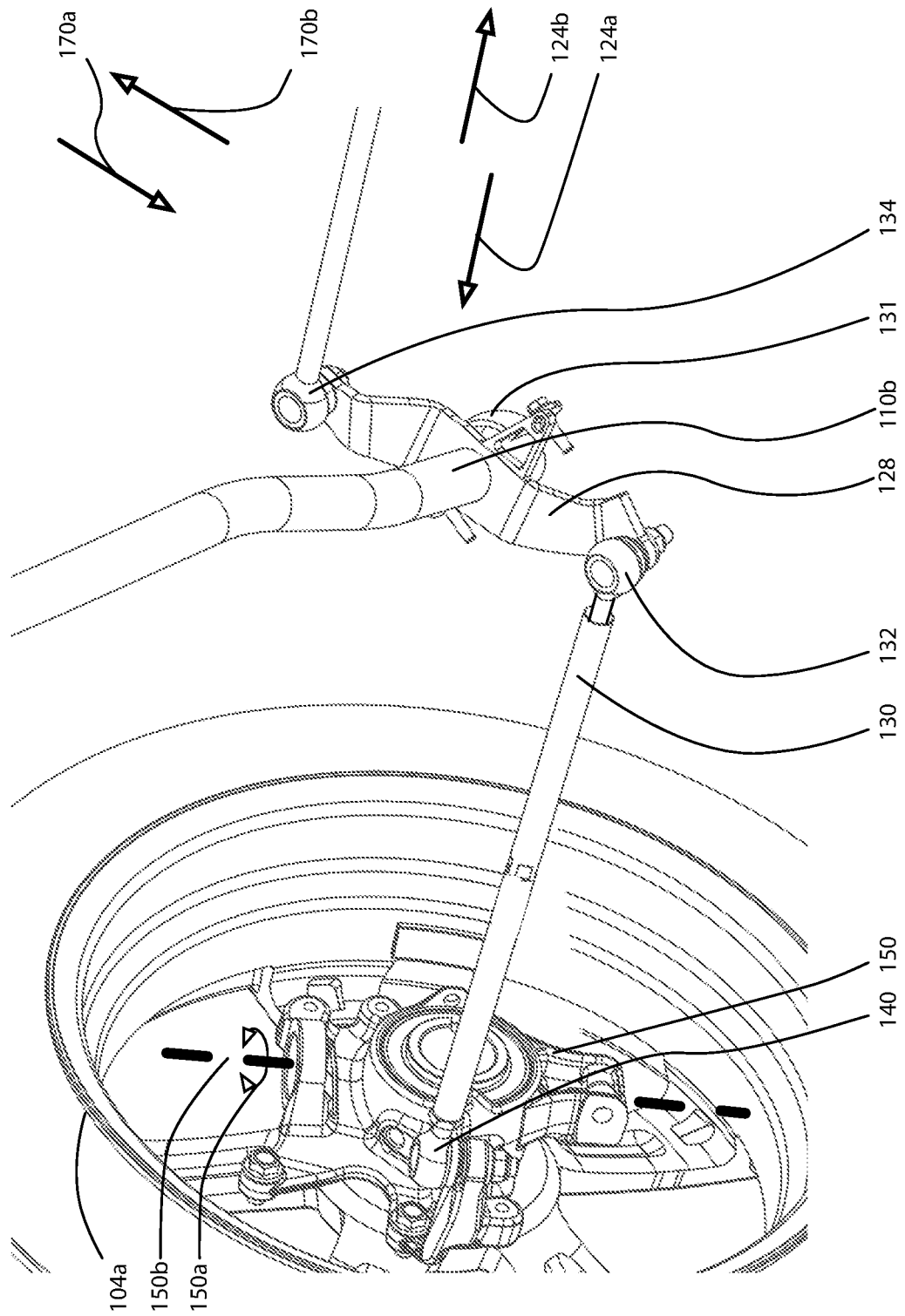
FIG. 1F is a close-up perspective view taken from a rear, right side of a left portion of the vehicle steering system and the left wheel of FIG. 1D.

As shown in FIGS. 1B and 1E, the pitman arm pivot axis 128b and the idler arm pivot axis extend 147 between a first line 154 and a second line 156. The first line 154 extends between the center points of the rod end 132 and the rod end 138. The second line 156 extends between the center points of a rod end 134 and a rod end 136, located at the forward extremities of the pitman arm 128 and the idler arm 146, respectively.

As best shown in FIG. 1D, a left tie rod 130 is pivotally connected to the pitman arm 128 on the rearward pitman arm portion 128c via the rod end 132. The left tie rod 130 extends leftward 124a and forward 170b from the pitman arm 128. The left tie rod 130 is pivotally operatively connected to the left steering knuckle 150 via a ball joint 140. The ball joint 140 connects to the left steering knuckle 150 at a point rearward of the left pivot axis 150b. The left tie rod 130 extends between left steering knuckle 150 and the pitman arm 128.

A right tie rod 148 is pivotally connected to the idler arm 146 on the rearward idler arm portion 146c via the rod end 138. The right tie rod 148 extends rightward 124b and forward 170b from the idler arm 146. The right tie rod 148 is pivotally operatively connected to the right steering knuckle 152 via a ball joint 142. The ball joint 142 connects to the right steering knuckle 152 at a point rearward of the right steering axis 152b. The right tie rod 148 extends between the right steering knuckle 152 and the idler arm 146.

In the present implementation, the left tie rod 130 and the right tie rod 148 are of substantially equal length. It is contemplated that in some implementations, the left tie rod 130 and the right tie rod 148 could have different lengths.

The link 144 is pivotally connected to the pitman arm 128 on the forward pitman arm portion 128d via the rod end 134. The link 144 extends rightward 124b from the pitman arm 128 through the central vertical longitudinal plane 124 and pivotally connects to the idler arm 146. The link 144 is pivotally connected on the forward idler arm portion 146d via the rod end 136. As such, the link 144 extends between the pitman arm 128 and the idler arm 146. The link 144 is positioned forward of the rod ends 132 and 138.

As can be seen in the figures, the link 144 is positioned forward of the pitman arm pivot axis 128b and the idler arm pivot axis 147. It is contemplated that in some implementations, such as the implementation shown in FIG. 4, the link 144 could be positioned rearward of the pitman arm pivot axis 128b and the idler arm pivot axis 147.

The pivotal operative connections provided by the rod ends 132, 134, 136 and 138, and ball joints 140, and 142 could be implemented via any other suitable pivotal operative connections.

With reference to FIGS. 1C and 2, the connection provided by each of the rod ends 132, 134, 136 and 138, and ball joints 140 and 142 can also be expressed in terms of connection points corresponding to the centers of those components. A distance 158 normal to the pitman arm pivot axis 128b between the pitman arm pivot axis 128b and the connection point defined by the rod end 134 is equal to a distance 160 normal to the idler arm pivot axis 147 between the idler arm pivot axis 147 and the connection point defined by the rod end 136.

A distance 162 normal to the pitman arm pivot axis 128b between the pitman arm pivot axis 128b and the connection point defined by the rod end 132 is equal to a 164 distance normal to the idler arm pivot axis 147 between the idler arm pivot axis 147 and the connection point defined by the rod end 138.

A distance 166 between the connection point defined by the rod end 132 and the connection point defined by the rod end 138 is greater than a distance 167 (FIG. 2) between the intersection of the pitman arm 128 and the pitman arm pivot axis 128b and the intersection of the idler arm 146 and the idler arm pivot axis 147. In addition, the distance 167 is greater than a distance 168 between the connection point defined by the rod end 134 and the connection point defined by the rod end 136.

It is contemplated that the proportions of the distances described above could be different from the proportions described above in order to provide a different steering geometry.

In the present implementation, the pitman arm pivot axis 128b and the idler arm pivot axis 147 define a plane 170. It is contemplated that in some implementations the pitman arm pivot axis 128b and the idler arm pivot axis 147 need not be positioned to define a plane. The connection points defined by the rod ends 134, 136 are disposed forward of the plane 170. The connection points defined by the rod ends 132, 138 are disposed rearward of the plane 170.

The front suspensions 114a, 114b are positioned substantially symmetrically about the central vertical longitudinal plane 124. The front left wheel 104a and the front right wheel 104b are positioned substantially symmetrically about the central vertical longitudinal plane 124. The left steering knuckle 150 and the right steering knuckle 152 are positioned substantially symmetrically about the central vertical longitudinal plane 124.

The pitman arm 128 and the idler arm 146 are positioned substantially symmetrically about the central vertical longitudinal plane 124 when the vehicle 10 is steered in a straight-ahead direction 100a. The pitman arm pivot axis 128b and the idler arm pivot axis 147 are positioned substantially symmetrically about the central vertical longitudinal plane 124.

When the vehicle 100 is steered straight-ahead 100a on level terrain, the connection point defined by the rod end 132 and the connection point defined by the rod end 138 are positioned substantially symmetrically about the central vertical longitudinal plane 124. When the vehicle 100 is steered in the straight-ahead direction 100a on level terrain, the connection point defined by the rod end 134 and the connection point defined by the rod end 136 are positioned substantially symmetrically about the central vertical longitudinal plane 124. When the vehicle 100 is steered in the straight-ahead direction 100a on level terrain, the connection point defined by the ball joint 140 and the connection point defined by the ball joint 142 are positioned substantially symmetrically about the central vertical longitudinal plane 124.

It is contemplated that the vehicle 100 could be implemented in asymmetric configurations. It is also contemplated that the vehicle steering system 126 could be implemented in asymmetric configurations. As an example, it is contemplated that the pitman arm pivot axis 128b and the idler arm pivot axis 147 could be positioned asymmetrically about the central vertical longitudinal plane 124.

The function of the vehicle steering system 126 is described next, with reference to FIGS. 1D and 2.

FIG. 2 is a simplified, two-dimensional schematic of the present implementation of the vehicle steering system 126. As best shown in this figure, the steering knuckles 150, 152 are configured and positioned such that the steering axes 150b, 152b are positioned forward 170b of the forces that the tie rods 130, 148 transfer between the front wheels 104a, 104b and the handlebar 112 when the vehicle 100 is in use. More particularly, the vectors of these forces, examples of which vectors are shown by reference arrows 130a and 148a, are rearward 170a of the steering axes 150b, 152b. As a result, the forces apply torques to the steering knuckles 150, 152 in directions that cause the steering knuckles 150, 152 to pivot in the same direction as the pitman arm 128 and the idler arm 146. This operation results in the front wheels 104a, 104b pivoting in the same direction as the pivoting of the handlebar 112.

When handlebar 112 and the pitman arm 128 pivot counterclockwise (as shown by reference arrow 129 in FIG. 1D) about the pitman arm pivot axis 128b, the idler arm 146 pivots counterclockwise about the idler arm pivot axis 147, and when the handlebar 112 and the pitman arm 128 pivot clockwise (in the opposite direction than the direction shown by reference arrow 129) about the pitman arm pivot axis 128b, the idler arm 146 pivots clockwise about the idler arm pivot axis 147.

More particularly, as best shown in FIG. 1D, when the pitman arm 128 pivots counterclockwise about the pitman arm pivot axis 128b, the following occurs:

a) the forward pitman arm portion 128d applies a force (illustrated by reference arrow 144a) to the forward idler arm portion 146d, via link 144, and thereby causes the idler arm 146 to pivot counterclockwise about the idler arm pivot axis 147;

b) the rearward pitman arm portion 128c applies a force (illustrated by reference arrow 128f) to the left steering knuckle 150, via the left tie rod 130, and thereby causes the left steering knuckle 150 to pivot counterclockwise about the left steering axis 150b;

c) the front left wheel 104a pivots counterclockwise about the left steering axis 150b with the left steering knuckle 150;

d) the rearward idler arm portion 146c applies a force (illustrated by reference arrow 146f) to the right steering knuckle 152, via the right tie rod 148, and thereby causes the right steering knuckle 152 to pivot counterclockwise about the right steering axis 152b; and e) the front right wheel 104b pivots counterclockwise about the right steering axis 152b with the right steering knuckle 152.

When the pitman arm 128 pivots clockwise about the pitman arm pivot axis 128b, the reverse of steps a) through e) happens and results in the pivoting of the front left wheel 104a and the front right wheel 104b clockwise about their respective steering axes 150b, 152b. In summary, pivoting of the handlebar 112 in a given direction pivots the steering column 110 in that given direction and pivots the front left and front right wheels 104a, 104b in that given direction. Thus, steering of the vehicle 100 is achieved.

FIG. 3 shows an alternative implementation of the vehicle steering system 126. The vehicle steering system 326 is the same as the vehicle steering system 126, except that the distance 302 between the connection points defined by the rod ends 132 and 138, which distance 302 in this figure is shown by dimension lines 302, is substantially equal to the distance 303 between the intersection of the pitman arm 128 and the pitman arm pivot axis 128b and the intersection of the idler arm 146 and the idler arm pivot axis 147, as well as to the distance 304 between the connection points defined by the rod ends 134 and 136, which distance 304 in this figure is shown by dimension lines 304. In this implementation, the equal distances 302, 303, 304 are achieved by selecting suitable dimensions for the link 144 and the tie rods 130, 148.

FIG. 4 shows yet another alternative implementation of the vehicle steering system 126. The vehicle steering system 426 is the same as the vehicle steering system 126, except insofar as it is described next. The pitman arm 428 is in on the rightward side 124b of the central vertical longitudinal plane 124, and the idler arm 446 is on the left side 124a of the central vertical longitudinal plane 124.

The left tie rod 130 is pivotally operatively connected to the rearward idler arm portion 446c. The right tie rod 148 is pivotally operatively connected to the rearward pitman arm portion 428c. That is, these two points of connection are on the same side, rearward 170a of the pitman arm pivot axis 428b and the idler arm pivot axis 446b. The link 144 extends between and is pivotally connected to rearward pitman arm portion 428c and the rearward idler arm portion 446c.

Accordingly, the steering knuckles 450, 452 are adapted such that when the pitman arm 428 and the idler arm 446 pivot counterclockwise, the steering knuckles 450, 452 pivot counterclockwise, and such that when the pitman arm 428 and the idler arm 446 pivot clockwise, the steering knuckles 450, 452 pivot clockwise.

It is contemplated that the vehicle steering system 126, 326, 426 described in this document could be implemented with any suitable power steering mechanism (not shown) to assist a driver in operating the vehicle steering system 126, 326, 426.

It contemplated that vehicle steering system 126, 326, 426 could be implemented such that the various axes of the vehicle steering system 126, 326, 426, such as the pitman and idler pivot axes 128b, 147 and the steering axes 150b, 152b, could be oriented relative to each other in orientations that are different from the orientations shown in the exemplary implementations described in this document. The various orientations could be selected to suit particular vehicles, or particular vehicle frames.

While the vehicle steering systems 126, 326, 426 are described with reference to being implemented in a front half of the vehicle 100, it is contemplated that depending on each particular vehicle, the vehicle steering systems 126, 326, 426 could be implemented in a rear half of the vehicle.

It is contemplated that for some vehicles, positioning the motor in a rear half of each vehicle, and particularly closer to the rear of each vehicle, may provide advantages. In such cases, the vehicle steering systems 126, 326, 426 could be implemented with such vehicles, and could be adapted to provide a usable space, such as part of a motor space, in the rear half of each vehicle.

As best seen in FIG. 2, the vehicle steering system 126 defines a usable space 190a between the pitman arm 128, the idler arm 146, and the link 144. It is contemplated that the usable space 190a is not limited to receiving the motor 192 therein. The usable space 190a could be adapted to accommodate vehicle components other than the motor 192. For example, the usable space 190a could be adapted to accommodate vehicle components such as a transmission (not shown), motor exhaust pipes (not shown), vehicle wiring conduits (not shown), and storage compartments (not shown).

It is contemplated that the vehicle steering systems 126, 326, 426 could be implemented with steering columns that are positioned in a position that is different from the position shown in the exemplary implementations described in this document.

It is contemplated that the vehicle steering systems 126, 326, 426 could be manufactured and sold separately from the vehicle 100. It is contemplated that the vehicle steering systems 126, 326, 426 could be manufactured to fit one particular vehicle model. It is also contemplated that one the vehicle steering systems 126, 326, 426 could be manufactured to fit two or more vehicle models.

It is further contemplated that the vehicle steering systems 126, 326, 426 could be manufactured to fit vehicles that fall into one or more ranges of vehicle specifications. Vehicle specifications could include any relevant specification, such as a specification of suitable motor mounts, frame configurations, and motor configurations. Implementing the vehicle steering systems 126, 326, 426 both in new vehicle manufacturing, as well as for vehicle retrofit purposes, is contemplated.

It is contemplated that the components of the vehicle steering systems 126, 326, 426 could have shapes, and orientations relative to each other, that are different from those shown and described. The shapes, orientations, and sizes of the components of a particular implementation of the vehicle steering systems 126, 326, 426 could be selected, for example, such that the particular implementation of the vehicle steering systems 126, 326, 426 could be implemented with a particular vehicle and/or to obtain certain steering characteristics.

It is contemplated that the vehicle 100 could be any other suitable vehicle. For example, the vehicle 100 could be a snowmobile, an all-terrain vehicle, or an amphibian vehicle. It is contemplated that the ground engaging members could be ground engaging members that are not wheels. For example, in a snowmobile the front steerable ground engaging members are left and right steerable skis and the rear ground engaging member is an endless track.

It is contemplated that the steering input device 112 could be any suitable device, such as a steering wheel.

In the present implementations, the tie rods 130, 148, the pitman arm 128, the idler arm 146, the steering knuckles 150, 152, the vehicle frame 102, the steering column 110, the handlebar 112 and the positioning frame member 102a are made of metal. However, it is contemplated that the vehicle 100 and the vehicle steering systems 126, 326, 426 could be implemented using any suitable material, or combination of materials.

Some non-limiting implementations of the present technology can be represented as presented in the following numbered clauses:

CLAUSE 1. A vehicle steering system comprising: a pitman arm adapted for being operatively connected to a steering column, the pitman arm being pivotable about a pitman arm pivot axis, the pitman arm being adapted for pivoting in response to pivoting of the steering column; a first tie rod pivotally connected to the pitman arm at a first point and extending from the pitman arm in a first direction; a link pivotally connected to the pitman arm at a second point and extending from the pitman arm in a second direction, the second direction being opposite the first direction; an idler arm pivotally connected to the link at a third point, the idler arm being pivotable about an idler arm pivot axis, the link extending between the pitman arm and the idler arm; and a second tie rod pivotally connected to the idler arm at a fourth point and extending from the idler arm in the second direction.

CLAUSE 2. The vehicle steering system of clause 1, wherein: the pitman arm pivot axis and the idler arm pivot axis extend between a first line and a second line; the first line extends between the first point and the fourth point; and the second line extends between the second point and the third point.

CLAUSE 3. The vehicle steering system of clause 1 or 2, wherein: the pitman arm pivot axis and the idler arm pivot axis define a plane; the first point and the fourth point are on a first side of the plane; and the second point and the third point are on a second side of the plane, the second side of the plane being opposite the first side of the plane.

CLAUSE 4. The vehicle steering system of any one of clauses 1 to 3, further comprising: the steering column operatively connected to the pitman arm; and a steering input device operatively connected to the steering column.

CLAUSE 5. The vehicle steering system of any one of clauses 1 to 4, further comprising: a first steering knuckle pivotally connected to the first tie rod at a fifth point, the first tie rod extending between the first steering knuckle and the pitman arm, the first steering knuckle being pivotable about a first steering axis; and a second steering knuckle pivotally connected to the second tie rod at a sixth point, the second tie rod extending between the second steering knuckle and the idler arm, the second steering knuckle being pivotable about a second steering axis.

CLAUSE 6. The vehicle steering system of any one of clauses 1 to 5, wherein a length of the first tie rod is equal to a length of the second tie rod.

CLAUSE 7. The vehicle steering system of any one of clauses 1 to 6, wherein a distance normal to the pitman arm pivot axis between the pitman arm pivot axis and the second point is equal to a distance normal to the idler arm pivot axis between the idler arm pivot axis and the third point.

CLAUSE 8. The vehicle steering system of any one of clauses 1 to 7, wherein a distance normal to the pitman arm pivot axis between the pitman arm pivot axis and the first point is equal to a distance normal to the idler arm pivot axis between the idler arm pivot axis and the fourth point.

CLAUSE 9. The vehicle steering system of any one of clauses 1 to 8, wherein a distance between the first and fourth points is greater than a distance between the second and third points.

CLAUSE 10. A vehicle, comprising: a vehicle frame; a steering column pivotally supported by the vehicle frame; a pitman arm operatively connected to the steering column, the pitman arm being pivotable about a pitman arm pivot axis, the pitman arm pivoting about the pitman arm pivot axis in response to pivoting of the steering column; a first tie rod pivotally connected to the pitman arm at a first point and extending from the pitman arm in a first direction; a link pivotally connected to the pitman arm at a second point and extending from the pitman arm in a second direction, the second direction being opposite the first direction; an idler arm pivotally connected to the link at a third point, the idler arm being pivotable about an idler arm pivot axis, the link extending between the pitman arm and the idler arm; a second tie rod pivotally connected to the idler arm at a fourth point and extending from the pitman arm in the second direction; a first steering knuckle, the first steering knuckle being pivotable about a first steering axis and being pivotally connected to the first tie rod at a fifth point, the first tie rod extending between the first steering knuckle and the pitman arm; a first steerable ground engaging member operatively connected to the first steering knuckle; a second steering knuckle, the second steering knuckle being pivotable about a second steering axis and being pivotally connected to the second tie rod at a sixth point, the second tie rod extending between the second steering knuckle and the idler arm; and a second steerable ground engaging member operatively connected to the second steering knuckle.

CLAUSE 11. The vehicle of clause 10, wherein: the pitman arm pivot axis and the idler arm pivot axis extends between a first line and a second line; the first line extends between the first point and the fourth point; and the second line extends between the second point and the third point.

CLAUSE 12. The vehicle of clause 10 or 11, wherein: the pitman arm pivot axis and the idler arm pivot axis define a plane; the first point and the fourth point are on a first side of the plane; and the second point and the third point are on a second side of the plane, the second side of the plane being opposite the first side of the plane.

CLAUSE 13. The vehicle of any one of clauses 10 to 12, wherein a length of the first tie rod is equal to a length of the second tie rod.

CLAUSE 14. The vehicle of any one of clauses 10 to 13, wherein a distance normal to the pitman arm pivot axis between the pitman arm pivot axis and the first point is equal to a distance normal to the idler arm pivot axis between the idler arm pivot axis and the fourth point.

CLAUSE 15. The vehicle of any one of clauses 10 to 14, wherein a distance normal to the pitman arm pivot axis between the pitman arm pivot axis and the second point is equal to a distance normal to the idler arm pivot axis between the idler arm pivot axis and the third point.

CLAUSE 16. The vehicle of any one of clauses 10 to 15, wherein a distance between the first and fourth points is greater than a distance between the second and third points.

CLAUSE 17. The vehicle of any one of clauses 10 to 16, wherein: the pitman arm is positioned on a first side of a central vertical longitudinal plane of the vehicle; and the idler arm is positioned on a second side of the central vertical longitudinal plane, the second side of the central vertical longitudinal plane being opposite the first side of the central vertical longitudinal plane.

CLAUSE 18. The vehicle of clause 17, wherein the pitman arm and the idler arm are positioned substantially symmetrically about the central vertical longitudinal plane.

CLAUSE 19. The vehicle of clauses 17 or 18, wherein the pitman arm pivot axis and the idler arm pivot axis are positioned substantially symmetrically about the central vertical longitudinal plane.

CLAUSE 20. The vehicle of any one of clauses 17 to 19, wherein when the vehicle is steered in a straight-ahead direction on level terrain: the first point and the fourth point are positioned substantially symmetrically about the central vertical longitudinal plane; the second point and the third point are positioned substantially symmetrically about the central vertical longitudinal plane; and the fifth point and the sixth point are positioned substantially symmetrically about the central vertical longitudinal plane.

CLAUSE 21. The vehicle of any one of clauses 17 to 20, wherein the link extends through the central vertical longitudinal plane.

CLAUSE 22. The vehicle of any one of clauses 10 to 21, wherein the link is positioned forward of the first and fourth points.

CLAUSE 23. The vehicle of any one of clauses 10 to 22, further comprising a motor for propelling the vehicle, the motor being supported by the vehicle frame, the motor being positioned at least partially rearward of the link, and at least partially between the first and fourth points.

Implementations of the present technology each have at least one of the above-mentioned object and/or aspects, but do not necessarily have all of them. It should be understood that some aspects of the present technology that have resulted from attempting to attain an above-mentioned object may not satisfy this object and/or may satisfy other objects not specifically recited herein.

Modifications and improvements to the above-described implementations of the present technology may become apparent to those skilled in the art. The foregoing description is intended to be exemplary rather than limiting.

The invention claimed is:
1. A vehicle steering system comprising:
a steering column;
a pitman arm connected to the steering column, the pitman arm being pivotable about a pitman arm pivot axis, at least a portion of the steering column being pivotable about the pitman arm pivot axis, the pitman arm pivoting about the pitman arm pivot axis in response to pivoting of the steering column;
a first tie rod pivotally connected to the pitman arm at a first point and extending from the pitman arm in a first direction;
a link pivotally connected to the pitman arm at a second point and extending from the pitman arm in a second direction, the second direction being opposite the first direction;

an idler arm pivotally connected to the link at a third point, the idler arm being pivotable about an idler arm pivot axis, the link extending between the pitman arm and the idler arm; and a second tie rod pivotally connected to the idler arm at a fourth point and extending from the idler arm in the second direction.

2. The vehicle steering system of claim 1, wherein the portion of the steering column is directly connected to the pitman arm.

3. The vehicle steering system of claim 1, wherein the portion of the steering column and the pitman arm pivot together about the pitman arm pivot axis.

4. The vehicle steering system of claim 1, wherein:
the pitman arm pivot axis and the idler arm pivot axis extend between a first line and a second line;
the first line extends between the first point and the fourth point; and
the second line extends between the second point and the third point.

5. The vehicle steering system of claim 1, wherein:
the pitman arm pivot axis and the idler arm pivot axis define a plane;
the first point and the fourth point are on a first side of the plane; and
the second point and the third point are on a second side of the plane, the second side of the plane being opposite the first side of the plane.

6. The vehicle steering system of claim 1, further comprising a steering input device operatively connected to the steering column.

7. The vehicle steering system of claim 1, wherein a distance normal to the pitman arm pivot axis between the pitman arm pivot axis and the second point is equal to a distance normal to the idler arm pivot axis between the idler arm pivot axis and the third point.

8. The vehicle steering system of claim 1, wherein a distance normal to the pitman arm pivot axis between the pitman arm pivot axis and the first point is equal to a distance normal to the idler arm pivot axis between the idler arm pivot axis and the fourth point.

9. The vehicle steering system of claim 1, wherein a distance between the first point and the fourth point is greater than a distance between the second point and the third point.

10. A vehicle, comprising:
a vehicle frame;
a steering column pivotally supported by the vehicle frame;
a pitman arm connected to the steering column, the pitman arm being pivotable about a pitman arm pivot axis, at least a portion of the steering column being pivotable about the pitman arm pivot axis, the pitman arm pivoting about the pitman arm pivot axis in response to pivoting of the steering column;
a first tie rod pivotally connected to the pitman arm at a first point and extending from the pitman arm in a first direction;
a link pivotally connected to the pitman arm at a second point and extending from the pitman arm in a second direction, the second direction being opposite the first direction;
an idler arm pivotally connected to the link at a third point, the idler arm being pivotable about an idler arm pivot axis, the link extending between the pitman arm and the idler arm;
a second tie rod pivotally connected to the idler arm at a fourth point and extending from the idler arm in the second direction;
a first steering knuckle, the first steering knuckle being pivotable about a first steering axis and being pivotally connected to the first tie rod at a fifth point, the first tie rod extending between the first steering knuckle and the pitman arm;
a first steerable ground engaging member operatively connected to the first steering knuckle;
a second steering knuckle, the second steering knuckle being pivotable about a second steering axis and being pivotally connected to the second tie rod at a sixth point, the second tie rod extending between the second steering knuckle and the idler arm; and
a second steerable ground engaging member operatively connected to the second steering knuckle.

11. The vehicle of claim 10, wherein:
the pitman arm is positioned on a first side of a central vertical longitudinal plane of the vehicle; and
the idler arm is positioned on a second side of the central vertical longitudinal plane, the second side of the central vertical longitudinal plane being opposite the first side of the central vertical longitudinal plane.

12. The vehicle of claim 11, wherein the pitman arm and the idler arm are positioned substantially symmetrically about the central vertical longitudinal plane.

13. The vehicle of claim 12, wherein the pitman arm pivot axis and the idler arm pivot axis are positioned substantially symmetrically about the central vertical longitudinal plane.

14. The vehicle of claim 11, wherein when the vehicle is steered in a straight-ahead direction on level terrain:
the first point and the fourth point are positioned substantially symmetrically about the central vertical longitudinal plane;
the second point and the third point are positioned substantially symmetrically about the central vertical longitudinal plane; and
the fifth point and the sixth point are positioned substantially symmetrically about the central vertical longitudinal plane.

15. The vehicle of claim 11, wherein the link extends through the central vertical longitudinal plane.

16. The vehicle of claim 10, wherein the link is positioned forward of the first point and the fourth point.

17. The vehicle of claim 10, further comprising a motor for propelling the vehicle, the motor being supported by the vehicle frame, the motor being positioned at least partially rearward of the link, and at least partially between the first point and the fourth point.

18. The vehicle of claim 17, wherein the motor is positioned at least partially between the pitman arm and the idler arm.

19. The vehicle of claim 10, wherein the link is positioned vertically higher than a point of connection between the steering column and the pitman arm.

20. The vehicle of claim 10, further comprising a motor for propelling the vehicle, the motor being supported by the vehicle frame, the motor being positioned at least partially between the pitman arm and the idler arm.

* * * * *